United States Patent [19]

Kitchen

[11] 4,355,084

[45] Oct. 19, 1982

[54] LOW TEMPERATURE BRAZE ALLOY AND COMPOSITE

[75] Inventor: Donald R. Kitchen, Rome, N.Y.

[73] Assignee: The United States of America as represented by the Secretary of the Air Force, Washington, D.C.

[21] Appl. No.: 132,453

[22] Filed: Mar. 21, 1980

[51] Int. Cl.³ .............................................. B32B 15/00
[52] U.S. Cl. ..................................... 428/672; 420/507
[58] Field of Search ........................... 75/165; 428/672

[56] References Cited

U.S. PATENT DOCUMENTS 3,036,139  5/1962  Feduska et al. ....................... 75/165
3,210,216 10/1965  Feduska et al. ....................... 75/165
3,472,653 10/1969  Short ..................................... 75/165
3,579,312  5/1971  Short ..................................... 75/165
4,214,904  7/1980  Kitchen et al. ....................... 75/165

Primary Examiner—R. Dean
Attorney, Agent, or Firm—Donald J. Singer; William J. O'Brien

[57] ABSTRACT

This invention relates to an alloy for bonding gold-plated substrates together. In a more specific aspect, it relates to a braze alloy for bonding gold-plated lids to gold-plated seal rings or gold-plated Kovar substrates. In another aspect, it deals with a method for bonding gold-plated lids to gold-plated Kovar substrates.

4 Claims, 4 Drawing Figures

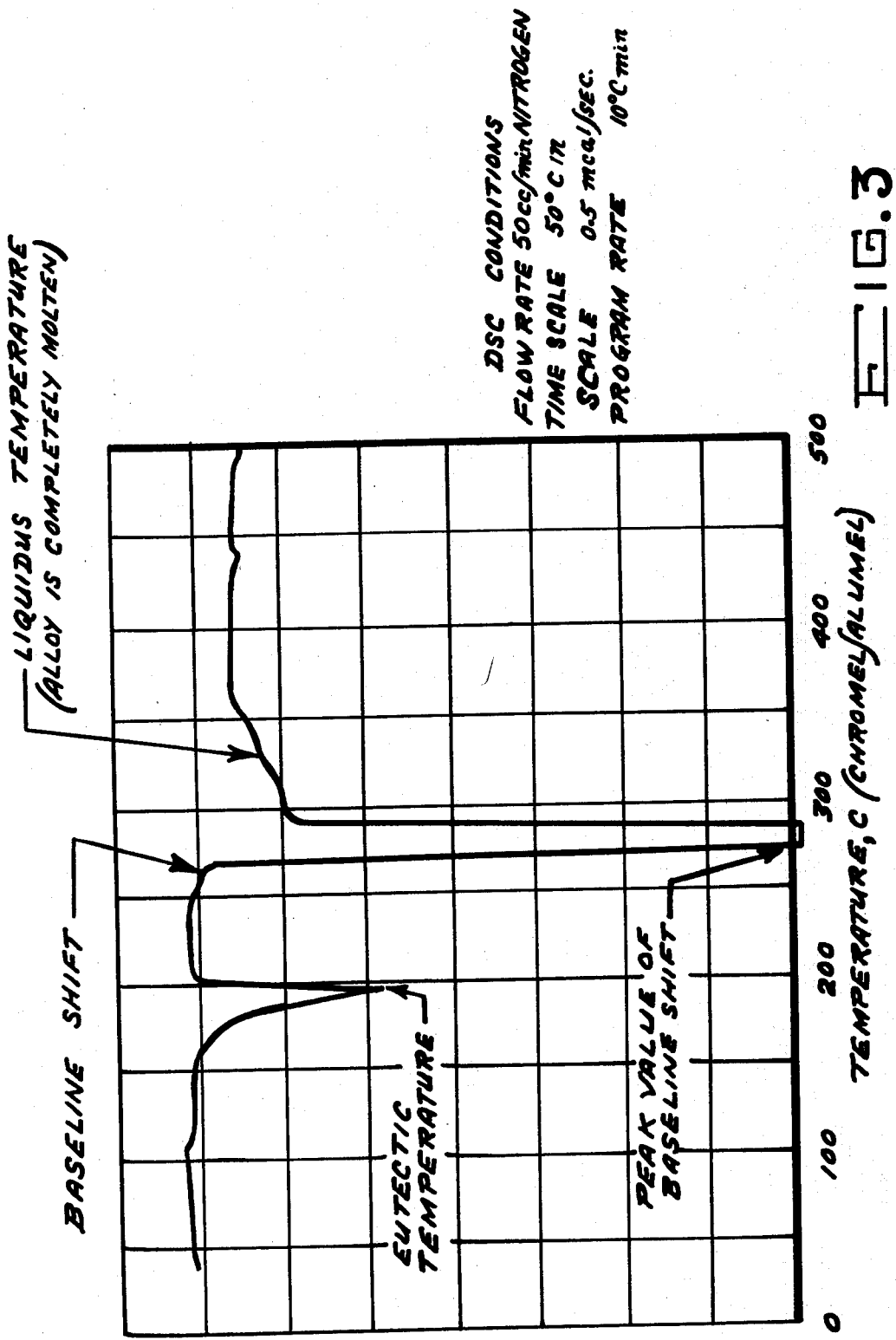

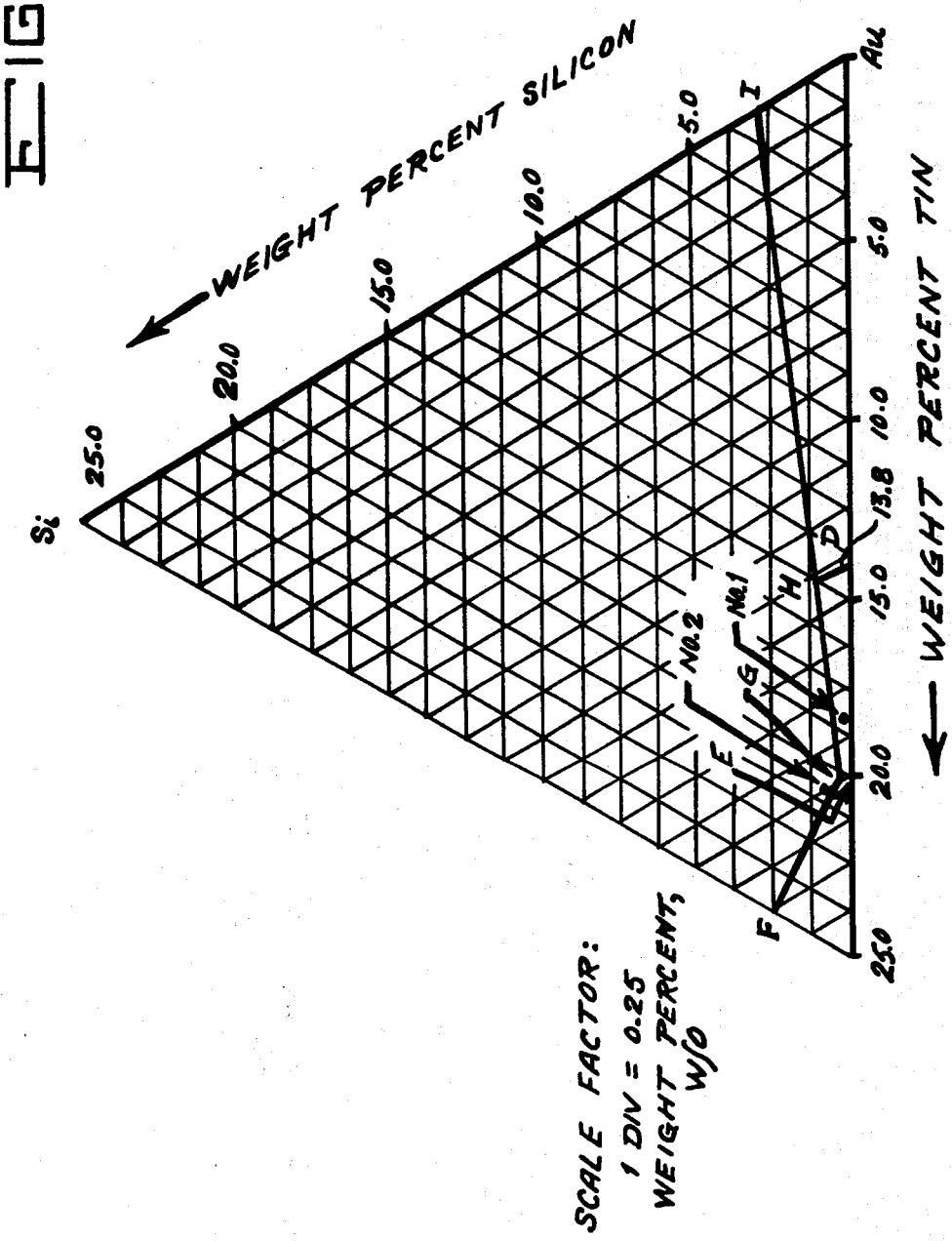

LOW TEMPERATURE BRAZE ALLOY AND COMPOSITE

STATEMENT OF GOVERNMENT INTEREST

The invention described herein may be manufactured and used by or for the Government for governmental purposes without the payment of any royalty thereon.

BACKGROUND OF THE INVENTION

The need to improve hermetic package sealing of integrated circuits has led to the discovery of a new, low temperature brazing alloy. Presently, some device manufacturers are using an 80/20 gold-tin alloy to seal the lid of an integrated circuit to its package, but several have encountered difficulties in fabricating a hermetic seal acceptable for high reliability applications. Selection of a new hermetic lid sealant, therefore has become a problem of paramount importance. However, to improve the lid seal, a better understanding of the characteristics of the commercial solder alloys presently available is required.

Integrated circuit packages are conventionally sealed with low melting point materials including hard solders, soft solders and epoxies. Hard solders are alloys which are free from temperature fatigue failures while soft solders are subject to such failures. This distinction has restricted hard solders to the low melting gold eutectics while soft solders include practically all lead and tin-based alloys. Epoxies are used when the physical and chemical characteristics of the chip are adversely affected by the high temperature generated by the sealing operation. In general, when soft solders and epoxies are compared to hard solders, the soft solders and epoxies exhibit greatly inferior strength, thermal and adhesive properties. Accordingly, it has been generally concluded that hard solders give the best performance in sealing operations. Furthermore, the best hard solder presently available for sealing packages appears to be a 80/20 gold-tin eutectic alloy. However, it has been found that even this alloy does not always give satisfactory results in that it sometimes fails to seal the lid to the substrate.

The gold-tin eutectic alloy referred to above contains 80.0 weight percent gold, balance tin, and has a minimum melting temperature of 280° C. Because of thermodynamic requirements, the gold-tin alloy would have to contain a greater percentage of gold than 80.0 weight percent in order to insure wetting of the gold-plated seal ring or substrate. However, at higher than 80.0 weight percent gold, the melting point of gold-tin alloys increases rapidly. The high melting point of such an alloy can result in poor wetting characteristics of the alloy and possible damage to the integrated circuit during the sealing operation.

SUMMARY OF THE INVENTION

The present invention concerns itself with a low temperature brazing alloy particularly adapted for brazing gold plated structures. The alloy is formulated from an admixture of specially controlled amounts of gold, tin and silicon as essential alloying ingredients. The alloy is especially useful in effectively bonding gold-plated lids to gold-plated seal rings or gold-plated Kovar substrates at brazing temperatures significantly lower than those occurring in the past. These lower temperatures minimize the damage to integrated circuit chips that often occurs during high temperature brazing operations. The essential alloying ingredients are present in the admixture in amounts ranging from about 81.0 to 82.5 weight percent gold, 0.20 to 0.45 weight percent silicon and about 17.05 to 18.80 weight percent tin.

Accordingly, the primary object of this invention is to provide a brazing alloy that can effectively bond gold-plated substrates together.

Another object of this invention is to provide an improved alloy having a melting point that is lower than the conventional gold-tin braze alloy.

Still another object of this invention is to provide a low temperature brazing alloy that has the ability to consistently wet gold and thus provide a metallurgical bond of high strength and long term reliability under operational conditions of severe stress and strain.

The above and still further objects and advantages of the present invention will become more readily apparent upon consideration of the following detailed disclosure thereof when viewed in conjunction with the accompanying drawing.

BRIEF DESCRIPTION OF THE DRAWING

In the drawing:

FIGS. 2 and 3 illustrate thermograms of the alloys of this invention; and

FIG. 4 illustrates in graphical form a projected view of the liquidus surfaces onto the base plane of the alloy system of this invention.

DESCRIPTION OF THE PREFERRED EMBODIMENT

Figure 1:
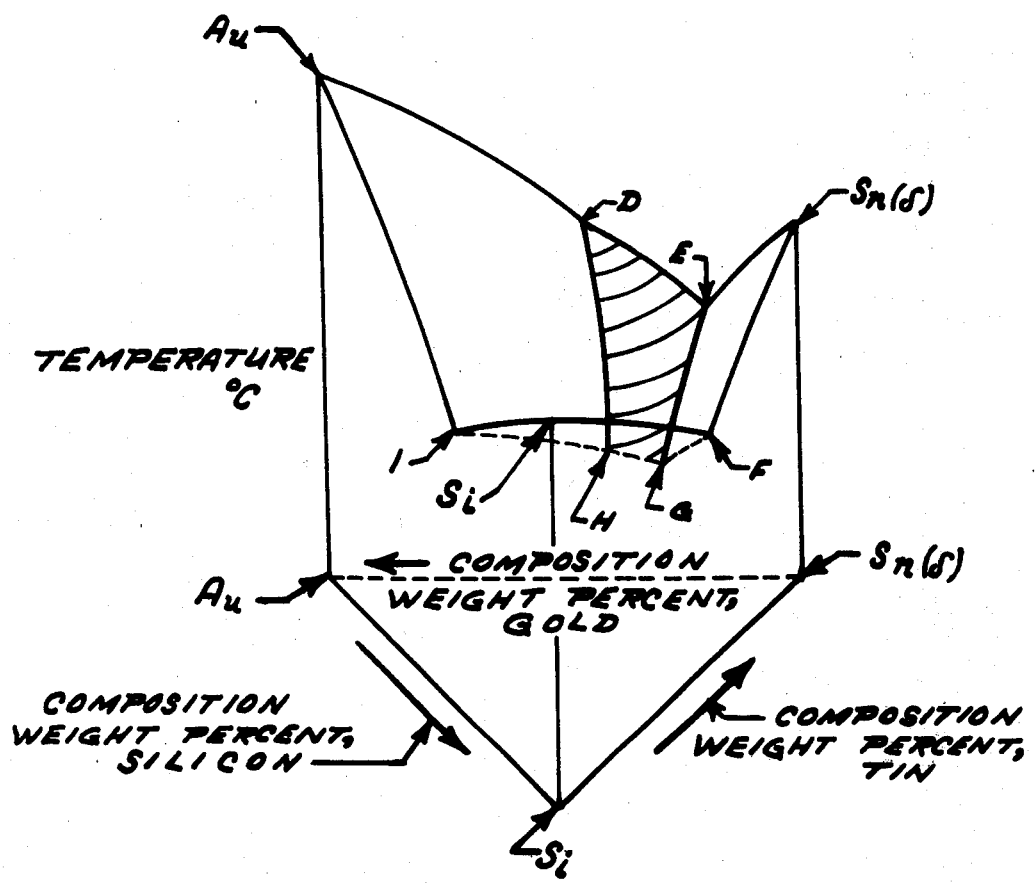
FIG. 1 illustrates a space model of the gold-silicon-tin ($\delta$) system of this invention.

Pursuant to the above-defined objects, this invention concerns itself with low melting temperature brazing alloys for use in joining together structural elements having gold-plated surfaces. Present industry methods use a gold-tin alloy for brazing gold-plated surfaces such as the lid of an integrated circuit package to its respective gold-plated substrate. The minimum melting temperature of this alloy is 280° C., at a tin content of 20.0 weight percent. In order to insure proper "wetting" of a gold-plated structure, however, the gold-tin braze alloy must contain a percentage of tin which is less than 20.0 weight percent because of thermodynamic equilibrium requirements. At less than 20.0 weight percent tin, however, the melting point of the gold-tin alloy increases rapidly. With this invention, on the other hand, it was found that the formulation of a ternary alloy of gold, tin and silicon having a particular compositional content provided an effective low temperature alloy particularly useful in bonding gold plated structures.

The braze alloy of this invention consists essentially of about 17.05 to 18.80 weight percent tin and about 0.20 to 0.45 weight percent silicon, the remainder being gold, i.e., about 81.0 to 82.5 weight percent gold. A preferred composition consists essentially of about 18.30 weight percent tin, about 0.20 weight percent silicon and about 81.50 weight percent gold. It is intended primarily for use as a replacement or substitute for the gold-tin eutectic alloy conventionally employed to seal integrated circuit packages. In order for a bond to form between the lid and substrate of the package, the gold-plated lid, gold-plated substrate and braze alloy must all be in equilibrium with each other during the sealing operation. The problems associated with the use of a gold-tin alloy as the brazing material can be more fully appreciated by considering briefly the three different cases of equilibrium freezing of the braze alloy that can occur depending upon whether the gross composition of the alloy lies on, to the left, or to the right of the eutectic composition.

Given the 80/20 eutectic composition in the conventional gold-tin system, a hypoeutectic alloy is defined to be an alloy which lies to the left of the eutectic composition and contains between 62.6 to 80.0 weight percent gold. As the molten alloy cools and freezing begins, crystals of the tin-rich phase separate out. These crystals continue to grow until the eutectic temperature of 280° C. is reached at which point the remaining liquid forms the eutectic structure.

A hypereutectic alloy is an allow which lies to the right of the eutectic composition and contains between 80.0 to 90.0 weight percent gold. The equilibrium freezing of this alloy follows a pattern similar to that described above for hypoeutectic alloys except that the gold-rich $\xi$ phase separates out when freezing begins. As freezing continues with decreasing temperature, the $\xi$ grains grow until the eutectic temperature is reached at which point the remaining liquid forms the eutectic structure.

In the equilibrium freezing of the eutectic alloy, no phase change occurs upon cooling until the eutectic temperature, 280° C., is reached. At this temperature the liquid decomposes into two solid phases, the tin-rich $\delta$ phase and the gold-rich $\xi$ phase, simultaneously. At room temperature, the resulting structure is only the eutectic structure. No large grains of the $\delta$ or $\xi$ phases form as they do upon equilibrium freezing of hypoeutectic and hypereutectic alloys.

From the foregoing discussion, certain conclusions can be drawn regarding gold-tin alloys. The use of a hypoeutectic alloy is undesirable since its liquid remains in chemical equilibrium only with the tin-rich $\delta$ phase. The eutectic composition is unsatisfactory since its liquid remains in chemical equilibrium with the tin-rich $\delta$ phase or the gold-rich $\xi$ phase only at the eutectic temperature. The hypereutetic alloys are the only alloys in the gold-tin system that remain in chemical equilibrium with the gold-rich $\xi$ phase during cooling. Moreover, since the $\epsilon$ phase consists from 90.0 to 91.0 weight percent gold, according to the gold-tin phase diagram, a hypereutectic alloy should also be in chemical equilibrium with pure gold. However, the addition of only a small amount of gold to the eutectic composition significantly increases the melting point of any hypereutectic alloy. For example, a one percent gold enrichment of the eutectic composition increases its melting point by 40 degrees (280° C. to 320° C.). A two percent enrichment increases the melting point 70 degrees, etc. (280° C. to 350° C.). This temperature increase is not desirable. But, it is precisely the gold enrichment of the eutectic composition which causes the braze alloy to be in chemical equilibrium with the gold-plated lid and substrate. The braze alloy must contain a percentage of gold greater than 80.0 weight percent, but also melt at a low temperature in order to form an effective and reliable seal.

In accordance with the present invention, the problem associated with the use of gold-tin alloys as brazing materials are overcome by providing a ternary system. As defined hereinabove, the ternary system consists essentially of specific amounts of gold, tin and silicon. It has been discovered that the addition of about 0.20 to 0.40 weight percent silicon to a gold-tin system causes a lowering of the compositions's melting point. The choice of silicon was predicated upon the requirement that the ternary system formed be eutectic in the sense that each of the constituent binary systems is eutectic. The silicon-tin and silicon-gold systems are simple binary eutectic systems with eutectic temperatures of 232° C. and 363° C., respectively. While tin and gold do not form a simple binary eutectic system, limiting the amount of tin to a maximum of 37.4 weight percent produces a system that has the characteristics of a simple eutectic system. That is, this limit bounds a system containing a eutectic alloy (80/20 gold-tin alloy) that melts at 280° C.

The resulting space model of the gold-silicon-tin ($\delta$) system of this invention is presented in FIG. 1. This diagram shows that the addition of a third element to the other binary eutectic systems causes a reduction in the melting point. For example, the addition of silicon to the gold-tin binary eutectic compositions, point E, reduces the melting point of the eutectic composition (shown by the line segment "EG"). The diagram also shows that as gold is added to the eutectic composition the melting point increases. However, this temperature increase is offset by adding silicon in amounts shown by the liquidus surface "EDHG". Thus, the alloys in the gold-silicon-tin ($\delta$) system, which have melting points lying on the liquidus surface "EDHG," are suitable for sealing gold plated surfaces such as a gold-plated lid to a gold-plated substrate.

As stated previously, the braze alloy must contain more gold than the conventional 80/20 gold-tin eutectic alloy in order to maintain equilibrium requirements between the gold plated lid and gold-plated substrate. It was found that the temperature increase caused by the addition of gold can be compensated for by adding silicon in the critical amount 0.20 to 0.45 weight percent to a gold-tin alloy as described above.

Thus, as was stated heretofore, the braze composition is one consisting essentially of about 81.0 to 82.5 weight percent gold, about 0.20 to 0.45 weight percent silicon and about 17.05 to 18.80 weight percent tin. The braze alloy melts at an average temperature of about 275° C. but the melting point can be varied from as low as 195° C. up to 490° C. At the optimum compositional content, the alloy will successfully braze at a brazing temperature of about 300° C.

The minimum melting temperature for the class of alloys contemplated by this invention is at the eutectic point G (196° C.) of the space model. The space model in FIG. 1 of the drawing is included to aid in identifying the thermodynamic properties necessary to understand the invention.

A more complete understanding of the invention can be obtained by referring to the following illustrative examples which are not intended, however, to be unduly limitative of the invention.

EXAMPLE 1

Runs were conducted in which alloy compositions A and B of the present invention, as shown in Table I hereinafter, were prepared. A control run was also carried out using the standard 80/20 gold-tin alloy.

In preparing the alloys, a vacuum furnace was used. A differential scanning colorimeter, DuPont 990 Thermal Analyzer, was used to measure temperature changes in the composition tested.

The overall composition of each alloy was selected to contain gold in amounts slightly greater than 80 weight percent. The weight percent silicon was then chosen, which also established the weight percent of tin required. The weight percentages for the components are shown in table I. Each of the elements was placed in a 5 ml boron nitride crucible which was positioned in the heating chamber of the furnace. A vacuum (less than $10^{-4}$ torr) was pulled on the furnace chamber to minimize the possibility of oxidizing the silicon. The temperature was increased to a maximum of 1500° C. to ensure that the silicon in the alloy completely melted. The power to the furnace was then turned off and the entire system was purged with argon so as to cool the system as quickly as possible. The crucible was removed from the furnace when it reached room temperature. The total elapsed time to manufacture the alloy was 10 minutes from the start of the melting operation to the removal of the crucible from the furnace.

After the meltdown, the sample alloy was removed from the crucible and placed on a balance for weighing. In each case the alloy lost weight when compared to its original weight before melting. At 1500° C. the vapor pressure of tin is about 0.210 torr while the vapor pressures of silicon and gold are 0.001 and 0.017 respectively. It was assumed that the elements were lost from the melt in the same ratio as the vapor pressures so that the weight loss in the alloys is attributable mostly to tin. The weight loss in percent is set forth in Table I.

Figure 2:
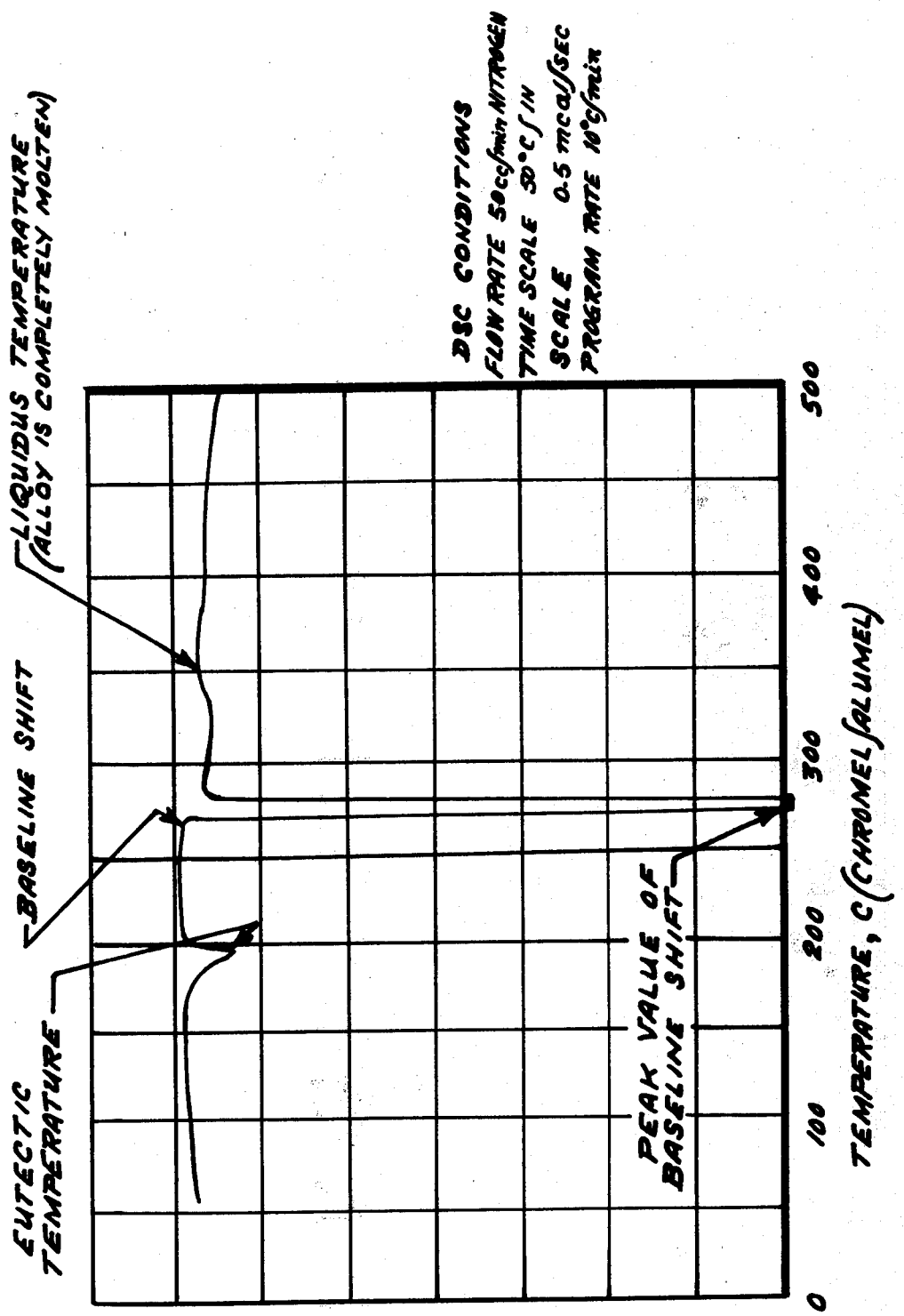

Each alloy prepared as described above was sectioned into smaller pieces with a low speed diamond saw to a thickness of 0.381 mm (15 mils). Each section was degreased in trichloroethylene, acetone, methanol and rinsed in distilled water, and finally dried with nitrogen. In order to determine the melting points, the samples were placed in the sample holder of the differential scanning calorimeter (DSC). The data obtained from each thermogram of alloys A and B generated by the DSC are shown in Table I while the thermograms themselves are shown in FIGS. 2 and 3, respectively.

The thermograms show three peaks for alloys A and B of Table I. The first peak is the ternary eutectic temperature of this system. The second peak represents the melting point of the alloys. Alloy A melts at 275° C.; alloy B melts at 276° C. The third peak, shown at 325° C. and 341° C. for alloys A and B respectively, is an artifact of the process used to make the braze alloy. Since the overall composition of the ternary alloy contains at least 81 weight percent gold and 17 weight percent tin, the matrix structure of the alloy consists primarily of the binary gold-tin eutectic structure. Thus, the liquidus temperatures shown by the thermograms correspond generally to the melting temperature of the matrix structure which is the binary gold-tin structure.

EXAMPLE 2

Alloy A, prepared as described in Example 1, and the 80/20 control alloy were each used to braze a gold-plated Kovar lid to a gold-plated Kovar substrate. The lids and substrates were ultrasonically cleaned prior to brazing by immersion in trichloroethylene, acetone, methanol and rinsing in distilled water, and drying in nitrogen. Kovar is a trade name for an iron-nickel-cobalt alloy having a compositional content as shown in Table II.

The lid was brazed to the substrate under an argon atmosphere in the following manner. The gold-plated Kovar substrate was placed on an aluminum block that was mounted inside a vacuum furnace. The braze alloy of the invention was placed on top of the substrate. The lid was subsequently positioned on the braze alloy. The temperature of the assembly was monitored with a standard chromel-alumel thermocouple which was fastened to the aluminum jig. The furnace was evacuated to less than $10^{-4}$ torr and then backfilled with argon. The temperature of the system was increased to 350° C. and held there for 2½ minutes. After brazing the lid/substrate combination was allowed to cool to room temperature in argon before venting to the atmosphere. This procedure was repeated for another lid and substrate but the control alloy was substituted for alloy A. The temperature of the system was also changed from 350° C. to 400° C.

TABLE I

| Alloy | Alloy Composition W/O Gold | Tin | Silicon | Weight Loss, % | Eutectic Temp. °C. | Baseline Shift Temp °C | Peak Value of Baseline Shift Temp °C. | Liquidus Temp. °C. |
|---|---|---|---|---|---|---|---|---|
| A | 81.5 | 18.30 | 0.20 | 0.21 | 195 | 269 | 275 | 325 |
| B | 82.0 | 17.60 | 0.40 | 0.22 | 195 | 266 | 276 | 341 |
| Control | 80.0 | 20.0 | — | — | 280 | — | — | — |

TABLE II

| | |
|---|---|
| Fe | 53.0 percent, nominal |
| Ni | 29.0 ± 1 percent |
| Co | 17.0 ± 1 percent |
| Mn | 0.60 percent, maximum |
| C | 0.06 percent, maximum |
| Si | 0.20 percent, maximum |
| Al | 0.10 percent, maximum |
| Zr | 0.10 percent, maximum |
| Ti | 0.10 percent, maximum |

X-ray micrographs were taken of the lid/substrate combinaton. The micrographs taken of the combination using alloy A as the brazing material showed wide spread melting of the braze alloy. The micrographs taken of the combination using the control alloy (80/20 gold-tin) revealed little melting as evidenced by the appearance of voids and by the lack of flow over the surface of the lid and substrate.

FIG. 4 is a projected view of the liquidus surface on to the base plane of the Au-Si-Sn (δ) system of this invention. On the graph, position No. 1 indicates the position of alloy A of Table I while position No. 2 indicates the position of a ternary alloy having a gold content of less than 80.0 weight percent. The alloy at position No. 2 is more specifically disclosed in copending U.S. patent application No. 968,873, U.S. Pat. No. 4,214,940 and is a ternary alloy consisting of 79.4 weight percent gold 20.0 weight percent tin, and 0.6 weight percent silicon. The alloy is adapted for bonding silicon surfaces to gold-plated surfaces. As can be seen, the alloy at position No. 1 is on the liquidus surface region DEGH while the alloy at position No. 2 is not so positioned. From classical thermodynamics, alloys contained within this area will be in chemical equilibrium with gold. Alloy No. 2 is different from alloy No. 1 because it is positioned in a different phase region as defined by Si-IHGF. Alloys within this region braze only silicon.

From the foregoing, it can be seen that the present invention provides a braze alloy which is effective in bonding gold-plated substrates at a temperature which is lower than that required when using a conventional gold-tin eutectic alloy as the brazing material. The present alloy also has the ability to consistently wet gold, a property which is necessary for proper bonding of gold-plated substrates.

As will be evident to those skilled in the art, modifications of the present invention can be made in view of the foregoing disclosure without departing from the spirit and scope of the invention.

What is claimed is:

1. A braze alloy for bonding gold-plated lids to gold-plated substrates, said alloy consisting essentially of about 81.0 to 82.5 weight percent gold, about 0.20 to 0.45 weight percent silicon, and the balance being substantially all tin.

2. A braze alloy according to claim 1 which consists essentially of 81.5 weight percent gold, 0.20 weight percent silicon, and 18.3 weight percent tin.

3. An article of manufacture composed of a gold-plated lid bonded to a gold-plated substrate with a braze alloy consisting essentially of about 81.0 to 82.5 weight percent gold, about 0.20 to 0.45 weight silicon, and the balance substantially all tin.

4. An article of manufacture according to claim 3 wherein said braze alloy consists essentially of about 81.5 weight percent gold, about 0.20 weight percent silicon, and about 18.3 weight percent tin.

* * * * *